United States Patent [19]

Jäger

[11] Patent Number: 5,580,965

[45] Date of Patent: Dec. 3, 1996

[54] DISAZO DYESTUFFS

[75] Inventor: Horst Jäger, Leverkusen, Germany

[73] Assignee: Bayer Aktiengesellschaft, Leverkusen, Germany

[21] Appl. No.: 618,708

[22] Filed: Mar. 20, 1996

[30] Foreign Application Priority Data

Mar. 27, 1995 [DE] Germany .................. 195 11 228.8

[51] Int. Cl.[6] .................. C09B 31/072; D06P 1/39; C09D 11/16

[52] U.S. Cl. .................. 534/829; 534/819; 106/22 K; 8/687; 8/918; 8/919

[58] Field of Search .................. 534/819, 829; 106/22 K; 8/687, 918, 919

[56] References Cited

U.S. PATENT DOCUMENTS

| | | | |
|---|---|---|---|
| 4,626,284 | 12/1986 | Ohta et al. | 106/22 K |
| 5,177,195 | 1/1993 | Gregory et al. | 534/829 |
| 5,281,263 | 1/1994 | Gregory et al. | 106/22 K |

OTHER PUBLICATIONS

Szadowski et al., Chemical Abstracts, 119:97947 (1993).
Ota et al, Chemical Abstracts, 105:80807 (1986).
Miura et al., Chemical Abstracts, 106:34599 (1986).

*Primary Examiner*—Fiona T. Powers
*Attorney, Agent, or Firm*—Sprung Horn Kramer & Woods

[57] ABSTRACT

Disazo dyestuffs have been found which, in the form of the free acid, correspond to the formula (I)

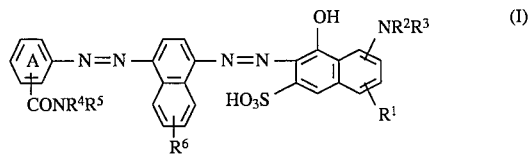

represents H or an optionally substituted aliphatic or aromatic radical and $R^1$ to $R^6$ and A have the meaning given in the description, which are outstandingly suitable for inkjet printing.

16 Claims, No Drawings

DISAZO DYESTUFFS

The invention relates to disazo dyestuffs, a process for their preparation, their use for dyeing or printing organic substrates containing hydroxyl groups or amide groups, and inks comprising these dyestuffs.

Disazo dyestuffs are already known from EP-A-494 523 (=U.S. Pat. No. A-5 177 195), but these still have certain disadvantages relating to their use.

Disazo dyestuffs which, in the form of the free acid, correspond to the formula (I)

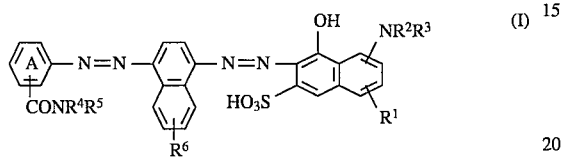

wherein the carboxamide group of the ring A is in the o-, m- or p-position relative to the azo bridge, $R^1$ denotes hydrogen or sulpho, $R^2$ and $R^3$ independently of one another represent hydrogen, an optionally substituted $C_6$–$C_{10}$-aryl radical, in particular phenyl radical, where possible substituents are, in particular, $C_1$–$C_4$-alkoxy, in particular $OCH_3$, $C_1$–$C_4$-alkyl, in particular methyl, halogen, in particular Cl, $SO_3H$ or COOH, or represent $C_1$–$C_6$-alkyl, which is optionally substituted by substituents such as OH, COOH, $OSO_3H$, $SO_3H$, CN and/or $OCH_3$, $R^4$ and $R^5$ independently of one another represent H or an aliphatic radical, in particular a $C_1$–$C_{17}$-alkyl radical, which is optionally substituted by substituents such as OH, COOH, $OSO_3H$, $SO_3H$, CN and/or $OCH_3$, or an aromatic $C_6$–$C_{10}$-aryl radical, in particular phenyl, which is unsubstituted or substituted by $C_1$–$C_4$-alkyl, in particular methyl, $C_1$–$C_4$-alkoxy, in particular methoxy, halogen, in particular Cl, $SO_3H$ and/or COOH, $R^6$ denotes hydrogen, $SO_3H$ or COOH, and the benzene ring A is optionally further substituted, have now been found. Substituents of the benzene ring A which are mentioned as examples are halogens, such as Cl, F or Br, $C_1$–$C_4$-alkyl radicals, such as methyl, and/or $C_1$–$C_4$-alkoxy radicals, such as methoxy.

Preferred disazo dyestuffs of the formula (I) correspond to the formula (II)

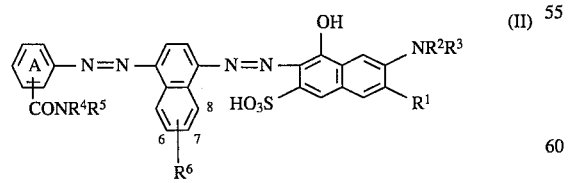

wherein $R^1$ to $R^6$ and A have the above meaning and $R^6$ is bonded in the 6-, 7- or 8-position of the naphthalene ring.

Particularly preferred disazo dyestuffs of the formula (I) are those wherein $R^2$ represents H or a radical of the formula

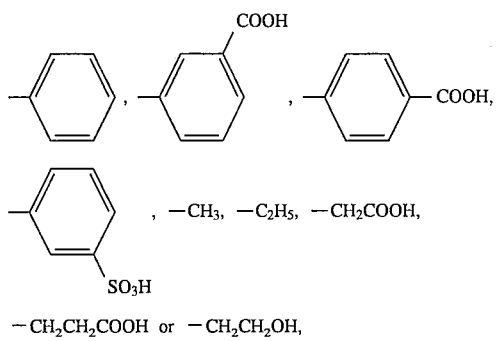

$-CH_2CH_2COOH$ or $-CH_2CH_2OH$, $R^3$ represents H or a radical of the formula

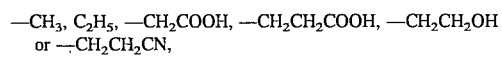

and the other radicals have the broadest abovementioned meaning.

Disazo dyestuffs of the formula (I) which are likewise particularly preferred are those wherein $R^4$ denotes H or a radical of the formula $-CH_3$, $-CH_2CH_2OH$, $-CH_2COOH$, $-CH_2CH_2COOH$, $-CH_2CH_2SO_3H$ or $-CH_2CH_2OSO_3H$, $R^5$ denotes H or $-CH_3$, $-CH_2CH_2OH$, $-CH_2COOH$, $-CH_2CH_2COOH$, $-(CH_2)_3-COOH$, $-(CH_2)_4-COOH$, $-(CH_2)_5-COOH$, $-(CH_2)_9-COOH$, $-(CH_2)_{10}-COOH$, $-(CH_2)_{11}-COOH$, $-(CH_2)_{12}-COOH$,

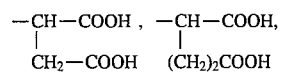

or

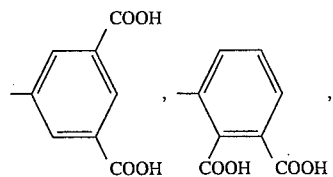

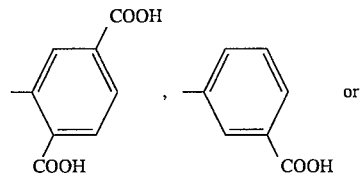

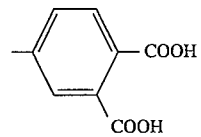

and the other radicals and the ring A have the broadest abovementioned meaning.

In an especially preferred embodiment of the disazo dyestuffs of the formula (I), the number of COOH groups in the radicals $R^1$ to $R^5$ is one or, in particular, two or three.

Disazo dyestuffs of the formula (I) which are also particularly preferred are those which correspond to the formula (III)

(III)

[Structure III: R⁵HNOC-A-N=N-naphthalene(with H, H, R⁶, HO₃S)-N=N-naphthalene(OH, NH₂, R¹)]

wherein

R⁵ denotes a radical of the formula

[phenyl with -(COOH)₂], in particular [phenyl with two COOH groups at 1,4-positions]

and

R¹ and R⁶ have the broadest abovementioned meaning and the ring A can be further substituted in the manner described above.

Dyestuffs of the formula (I) which are furthermore preferred are those wherein

R¹=H and R⁶=SO₃H, or

R¹=SO₃H and R⁶=SO₃H, or

R¹=SO₃H and R⁶=H, or

R¹ and R⁶=H.

The dyestuffs according to the invention are in general employed in the form of their salts, in particular the alkali metal salts (Li, Na, K), the ammonium salts, mono-, di- or tris-$C_1$–$C_4$-alkylammonium salts or, in particular, also the $C_1$–$C_4$-alkanolammonium salts. It is particularly advantageous to employ the dyestuffs according to the invention in the form of their ammonium salts (NH₄) or their mixed ammonium/alkali metal salts.

The invention furthermore relates to a process for the preparation of the dyestuffs of the formula (I) according to the invention, characterized in that amines of the formula (IV)

[Structure IV: R⁵R⁴NOC-A-phenyl-NH₂]

wherein the carboxamide group is in the o-, m- or p-position relative to the NH₂ group, R⁴ and R⁵ have the broadest abovementioned meaning and the ring A can be further substituted in the abovementioned manner, are diazotized and the diazotization products are coupled with 1-aminonaphthalenes of the formula (V)

[Structure V: naphthalene with NH₂ and R⁶]

wherein R⁶ has the broadest meaning given, in the acid to neutral pH range to give a monoazo dyestuff of the formula (VI)

[Structure VI: R⁵R⁴NOC-A-N=N-naphthalene(NH₂, R⁶)]

which is then diazotized, preferably without intermediate isolation, and the diazotization product is coupled with a coupling component of the formula (VII)

[Structure VII: naphthalene with OH, NR²R³, HO₃S, R¹]

wherein R¹, R² and R³ have the broadest above meaning, in the neutral to alkaline pH range to give the dyestuff of the formula (I).

The process is preferably carried out in water. Preferably, the reaction of the diazotized compound IV with the compound V is carried out at pH values of 2 to 8, in particular 4 to 6. A pH range of 6 to 10, in particular 7 to 9, is preferably chosen for the reaction of the diazotized form of the compound of the formula VI with the compound of the formula VII.

The compounds of the formula (IV) can be obtained, for example, by acylation of compounds of the formula (VIII)

R⁵R⁴NH            (VIII), wherein R⁵ and R⁴ have the meaning given, with carboxylic acid chlorides of the formula (IX)

[Structure IX: ClOC-A-NO₂]

wherein the ring A can be further substituted in the above manner and the chlorocarbonyl group is bonded to the nitro group in the o-, m- or p-position, and reduction of the compound formed by this reaction. The reduction can be carried out, for example, by means of hydrogen in the presence of Raney nickel.

Examples of compounds of the formulae V, VII, VIII and IX are the following:

Compounds V 1-aminonaphthalene 1-aminonaphthalene-6-sulphonic acid 1-aminonaphthalene-7-sulphonic acid 1-aminonaphthalene-6-carboxylic acid 1-aminonaphthalene-7-carboxylic acid Compounds VII 1-hydroxy-7-amino-naphthalene-3,6-disulphonic acid 1-hydroxy-7-amino-naphthalene-3-sulphonic acid 1-hydroxy-7-phenylamino-naphthalene-3,6-disulphonic acid 1-hydroxy-7-(3'-carboxy-phenylamino)-naphthalene-3-sulphonic acid 1-hydroxy-7-(4'-carboxy-phenylamino)-naphthalene-3-sulphonic acid 1-hydroxy-7-carboxymethylamino-naphthalene-3-sulphonic acid 1-hydroxy-7-(bis-β-hydroxyethylamino)-naphthalene-3-sulphonic acid 1-hydroxy-7-β-carboxyethylamino-naphthalene-3-sulphonic acid Compounds VIII 1-amino-3,5-dicarboxy-benzene 1-amino-2,5-dicarboxy-benzene 1-amino-2,4-dicarboxy-benzene 1-amino-3,4-dicarboxy-benzene 1-amino-2,3-dicarboxy-benzene aminoacetic acid methylaminoacetic acid 3-aminopropionic acid 4-aminobutyric acid 6-amino-caproic acid 11-aminoundecanoic acid aminosuccinic acid aminoglutaric acid N,N-bis-(β-carboxyethyl)-amine diethanolamine taurine methyltaurine Compounds IX 2-nitrobenzoyl chloride 3-nitrobenzoyl chloride 4-nitrobenzoyl chloride 4-chloro-3-nitrobenzoyl chloride 4-methyl-3-nitrobenzoyl chloride The dyestuffs of the formula (I) can be converted into their ammonium or optionally substituted alkylammonium salts, for example, by acidifying the solution of an alkali metal salt of a dyestuff of the formula (I) in water with a mineral acid (pH 1 to 3), isolating the dyestuff which has precipitated out and if appropriate washing it with water, subsequently stirring the paste of the dyestuff in water and bringing the mixture to pH 9.0 to 10.0 with ammonia or an optionally substituted alkylamine, and if appropriate rendering the resulting solution salt-free by dialysis.

The compounds of the formula (I) in the form of their salts and mixtures thereof are used for dyeing or printing organic substrates containing hydroxyl groups or amide groups, preferably textile materials consisting of cellulose fibres or comprising these, such as cotton, and for dyeing or printing paper or leather.

The compounds of the formula (I) are preferably suitable as dyestuffs for inkjet recording liquids.

To prepare these printing inks, which are also according to the invention, at least one dyestuff of the formula (I) is dissolved in water and/or one or more organic solvents, if appropriate with addition of organic and/or inorganic acids or organic and/or inorganic bases. A dyestuff of the formula (I) which has first been purified, desalinated and if appropriate concentrated by using membrane processes, such as, for example,-ultrafiltration, microfiltration, reverse osmosis or a combination thereof, is preferably used for preparation of these printing inks. The solutions or suspensions obtained in the membrane processes described can be employed directly for the preparation of the printing inks. However, it is also possible first to convert the solutions or suspensions into solid formulations, for example by spray drying.

It is also possible to convert the synthesis solution or suspension obtained during synthesis of the dyestuff into the printing inks without intermediate isolation of the dyestuff, if appropriate with addition of inorganic and/or organic bases or inorganic and/or organic acids and if appropriate with addition of one or more organic solvents and water.

The synthesis solution or suspension is preferably purified and desalinated beforehand by using membrane processes, such as, for example, ultrafiltration, microfiltration and reverse osmosis or a combination thereof.

These printing inks preferably comprise 0.1 to 20% by weight, in particular 0.5 to 15% by weight, and especially preferably 0.5 to 10% by weight, of a dyestuff of the formula (I) dissolved in water and/or one or more organic solvents. The pH of the printing inks can be between pH 3 and 9. The printing inks preferably have a pH of 4 to 8.

Customary organic and/or inorganic acids, such as, for example, hydrochloric acid, lactic acid, p-toluenesulphonic acid, acetic acid or citric acid, or organic and/or inorganic bases, such as alkali metal hydroxides or amines, such as methyldiethanolamine, diethanolamine, triethanolamine or polyglycolamines, such as, for example, the reaction product of ammonia with 6 mol of ethylene oxide, can be employed to adjust the pH. The printing inks can furthermore comprise customary buffers, such as, for example, acetates, citrates or phosphonates, in the amounts customary for these substances.

The printing inks according to the invention furthermore can comprise customary additives, such as, for example, surfactants, fungicides, bactericides or binders, such as, for example, acrylate binders, in the amounts customary for these additives.

The printing inks according to the invention in general comprise up to 50% by weight of organic solvents, but preferably less than 30% by weight. Printing inks which comprise 2 to 30% by weight of organic solvents are particularly preferred here.

Possible organic solvents are, in particular, water-soluble organic solvents, such as, for example, $C_1$–$C_4$-alkanols, such as methanol, ethanol, n-propanol, isopropanol, n-butanol, sec-butanol, tert-butanol or isobutanol; pentanediols; hexanetriols; amides, such as formamide and dimethylacetamide; ketones or ketone alcohols, such as acetone and diacetone alcohols; esters, such as tetrahydrofuran and dioxane; nitrogen-containing heterocyclic compounds, such as 2-pyrrolidone, N-methyl-pyrrolid-2-one and 1,3-dimethylimidazolid-2-one; polyalkylene glycols, such as polyethylene glycol and polypropylene glycol; alkylene glycols and thioglycols with $C_2$–$C_6$-alkylene units, such as ethylene glycol, propylene glycol, butylene glycol, triethylene glycol, thiodiglycol, hexylene glycol and diethylene glycol; other polyols, such as glycerol and 1,2,6-hexanetriol; and alkyl ethers and polyalkyl ethers of alcohols, such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol and 2-[2-(2-ethoxyethoxy)ethoxy]ethanol.

Preferred water-soluble organic solvents are glycols and glycol ethers, such as ethylene glycol, diethylene glycol, triethylene glycol and 2-methoxy-2-ethoxy-2-ethoxyethanol; polyethylene glycol having a molecular weight of up to 500; heterocyclic ketones, such as 2-pyrrolidone, N-methylpyrrolid-2-one and 1,3-dimethylimidazolid-2-one; and 1,5-pentanediol. Preferred solvent mixtures are binary mixtures of water and diethylene glycol, water and 2-pyrrolidone, and water and 1,5-pentanediol, and ternary mixtures of water, diethylene glycol and N-methyl-pyrrolid-2-one.

In addition to the dyestuffs of the formula (I), the printing inks can also additionally comprise one or more dyestuffs customary for printing inks, such as, for example, the dyestuffs listed in the Colour Index, which can be used, for example, for shading.

The printing inks according to the invention are preferably used as a recording liquid for inkjet recording systems. The inkjet recording systems are, for example, inkjet printers, such as the thermal jet, bubble jet, piezo inkjet or valve inkjet. The preferred recording material for inkjet printers is paper.

The inkjet recording process is known per se. In this process, droplets of a writing liquid are shot from one or more small jets in a controlled manner onto a carrier material. The individual droplets are composed into characters or graphic patterns by electronic control. It is necessary here for the ink to interact with the carrier material, preferably paper. The ink should penetrate into the paper without running too much, since otherwise the print quality suffers. The printed information must dry rapidly, and be waterproof and smudge-proof. Many inks have some of the properties required at the expense of the other properties.

Surprisingly, it has been found that the dyestuffs of the formula (I) according to the invention in the form of their printing inks produce particularly waterproof and smudge-proof prints in inkjet recording systems. The printing inks according to the invention result in good water-fastnesses on a large number of different papers. Suitability for a large number of non-coated papers, so-called plain papers, is particularly important. The widely used largely neutral writing papers which are finding increasing use should be mentioned here in particular.

Printing of films of plastic with ink recording processes using the printing inks according to the invention is equally preferred. The films of plastic preferably employed here are transparent polyethylene films.

The invention furthermore relates to a process for dyeing paper in the pulp, characterized in that a dyestuff of the formula (I) is used.

When the dyestuffs of the formula (I) are used in the form of their printing inks as recording liquids for inkjet recording systems, black sharp prints with a good fastness to water, light and abrasion are obtained.

The inks according to the invention are stable to storage and-during use, their viscosity and their surface tension can be adjusted to suit the various requirements, and they have a good recording capacity and jet stabilities.

The formulae of the water-soluble dyestuffs in the description and in the examples are those of the free acids. The dyestuffs are in general used in the form of their alkali metal, ammonium and substituted ammonium salts or their mixed salts.

EXAMPLE 1

30 g (0.1 mol) of 5-[(4'-aminobenzoyl)amino]-1,3-biscarboxy-benzene (diazo component; obtainable by acylation of 5-aminoisophthalic acid with p-nitrobenzoyl chloride and subsequent reduction of the nitro group) were dissolved in 500 ml of water at pH 8 to 9.70 ml of 10% strength sodium nitrite solution were added and the mixture was added dropwise to an initial mixture of 40 ml of concentrated hydrochloric acid and 200 ml of ice-water. The resulting suspension was stirred at 10° to 15° C. for 2 hours and the excess nitrite was removed with amidosulphonic acid.

A neutral solution of 22.3 g (0.1 mol) of 1-amino-6-sulpho-naphthalene (middle component) in 300 ml of water was added dropwise to this suspension at 5° to 10° C. and the pH was brought to 5.0 to 5.5 by sprinkling in sodium bicarbonate. The mixture was then stirred for 2 to 3 hours in order to bring the coupling to completion.

The dyestuff which had precipitated out was filtered off with suction. The resulting paste was dissolved in 500 nil of water at pH 8 to 9. 70 ml of 10% strength sodium nitrite solution were added to the solution and the mixture was added dropwise to an initial mixture of 40 ml of concentrated hydrochloric acid and 200 ml of water at 20° to 25° C. The mixture was stirred at room temperature until the diazotization had ended. The excess nitrite was removed with amidosulphonic acid. The suspension of the diazo compound was then added to a solution of 31.9 g of 2-amino-8-hydroxy-naphthalene-3,6-disulphonic acid (end component) in 200 ml of water while stirring thoroughly, a pH of 8.5 to 9.5 being maintained by simultaneous dropwise addition of 15% strength sodium carbonate solution. The mixture was stirred for a further 1 to 2 hours and the dyestuff which had precipitated out was filtered off with suction. For purification, the dyestuff was dissolved in water at 50° C. and pH 9 and salted out again with 3% by volume of sodium chloride.

The paste was then dissolved in water and dialysed. After the dialysis, the solution was filtered through a 2.0μ filter and dried. A black powder which dissolved readily in water was obtained.

In the form of the free acid, the dyestuff corresponds to the following formula

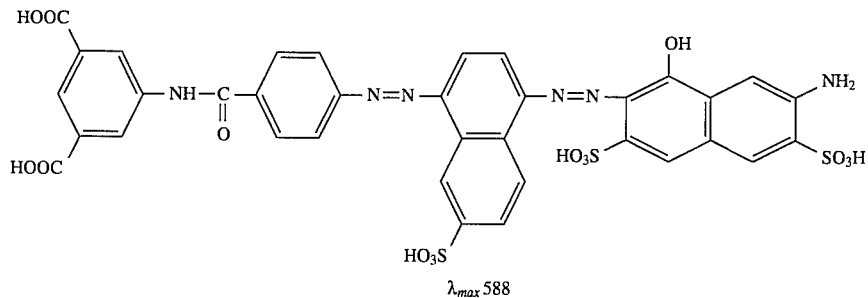

$\lambda_{max}$ 588

Further black dyestuffs were obtained in accordance with the instructions of this example when the diazo, middle and end components listed below were used.

| Ex. | Diazo component | Middle component | End component | $\lambda_{max}$ (nm) |
|---|---|---|---|---|
| 2 | 5-[(4'-Amino-benzoyl)amino]-1,3-biscarboxy-benzene | 1-Amino-naphthalene-7-sulphonic acid | 2-Amino-8-hydroxy-naphthalene-3,6-disulphonic acid | 588 |
| 3 | 5-[(4'-Amino-benzoyl)amino]-1,3-biscarboxy-benzene | 1-Amino-naphthalene-7-sulphonic acid | 2-Amino-8-hydroxy-naphthalene-6-disulphonic acid | 580 |
| 4 | 5-[(4'-Amino-benzoyl)amino]-1,3-biscarboxy-benzene | 1-Amino-naphthalene-6-sulphonic acid | 2-Amino-8-hydroxy-naphthalene-6-disulphonic acid | 580 |
| 5 | 2-[(4'-Amino-benzoyl)amino]-1,4-biscarboxy-benzene | 1-Amino-naphthalene-6-sulphonic acid | 2-Amino-8-hydroxy-naphthalene-3,6-disulphonic acid | 588 |
| 6 | 4-[(4'-Amino-benzoyl)amino]-1,2-biscarboxy-benzene | 1-Amino-naphthalene-6-sulphonic acid | 2-Amino-8-hydroxy-naphthalene-3,6-disulphonic acid | 589 |
| 7 | 4-[(4'-Amino-benzoyl)amino]-1,2-biscarboxy-benzene | 1-Amino-naphthalene-7-sulphonic acid | 2-Amino-8-hydroxy-naphthalene-3,6-disulphonic acid | 588 |
| 8 | 3-[(4'-Amino-benzoyl)amino]-1,2-biscarboxy-benzene | 1-Amino-naphthalene-6-sulphonic acid | 2-Amino-8-hydroxy-naphthalene-3,6-disulphonic acid | 587 |
| 9 | 3-[(4'-Amino-benzoyl)amino]-1,2-biscarboxy-benzene | 1-Amino-naphthalene-7-sulphonic acid | 2-Amino-8-hydroxy-naphthalene-3,6-disulphonic acid | 588 |
| 10 | 5-[(3'-Amino-benzoyl)amino]-1,3-biscarboxy-benzene | 1-Amino-naphthalene-7-sulphonic acid | 2-Amino-8-hydroxy-naphthalene-3,6-disulphonic acid | 589 |
| 11 | 5-[(3'-Amino-benzoyl)amino]-1,3-biscarboxy-benzene | 1-Amino-naphthalene-6-sulphonic acid | 2-Amino-8-hydroxy-naphthalene-3,6-disulphonic acid | 587 |
| 12 | 5-[(4'-Amino-benzoyl)amino]-1,3-biscarboxy-benzene | 1-Amino-6-carboxy-naphthalene | 2-Amino-8-hydroxy-naphthalene-3,6-disulphonic acid | 590 |
| 13 | 5-[(4'-Amino-benzoyl)amino]-1,3-biscarboxy-benzene | 1-Amino-7-carboxy-naphthalene | 2-Amino-8-hydroxy-naphthalene-3,6-disulphonic acid | 590 |
| 14 | 5-[(4'-Amino-benzoyl)amino]-1,3-biscarboxy-benzene | 1-Aminonaphthalene | 2-Amino-8-hydroxy-naphthalene-3,6-disulphonic acid | 592 |
| 15 | N-(4-Aminobenzoyl)-amino-acetic acid | 1-Amino-naphthalene-6-sulphonic acid | 2-Amino-8-hydroxy-naphthalene-3,6-disulphonic acid | 579 |
| 16 | 2-N-(4'-Amino-benzoyl)-amino-propionic acid | 1-Amino-naphthalene-6-sulphonic acid | 2-Amino-8-hydroxy-naphthalene-3,6-disulphonic acid | 578 |
| 17 | 4-N-(4'-Amino-benzoyl)-amino-butyric acid | 1-Amino-naphthalene-6-sulphonic acid | 2-Amino-8-hydroxy-naphthalene-3,6-disulphonic acid | 578 |
| 18 | 6-N-(4'-Amino-benzoyl)-amino-caproic acid | 1-Amino-naphthalene-6-sulphonic acid | 2-Amino-8-hydroxy-naphthalene-3,6-disulphonic acid | 579 |
| 19 | 11-N-(4'-Amino-benzoyl)-amino-undecanoic acid | 1-Amino-naphthalene-6-sulphonic acid | 2-Amino-8-hydroxy-naphthalene-3,6-disulphonic acid | 579 |
| 20 | N-(4'-Amino-benzoyl)amino-succinic acid | 1-Amino-naphthalene-6-sulphonic acid | 2-Amino-8-hydroxy-naphthalene-3,6-disulphonic acid | 578 |
| 21 | 5-[(4'-Amino-benzoyl)amino]-1,3-biscarboxy-benzene | 1-Amino-naphthalene-6-sulphonic acid | 2-(3'-Carboxyphenyl)-amino-8-hydroxy-naphthalene-6-sulphonic acid | |
| 22 | 5-[(4'-Amino-benzoyl)amino]-1,3-biscarboxy-benzene | 1-Amino-naphthalene-6-sulphonic acid | 2-(4'-Carboxyphenyl)-amino-8-hydroxy-naphthalene-6-sulphonic acid | |
| 23 | 5-[(4'-Amino-benzoyl)amino]-1,3-biscarboxy-benzene | 1-Amino-naphthalene-6-sulphonic acid | 2-(3'-Sulphophenyl)-amino-8-hydroxy-naphthalene-6-sulphonic acid | |
| 24 | 5-[(4'-Amino-benzoyl)amino]-1,3-biscarboxy-benzene | 1-Amino-naphthalene-6-sulphonic acid | 2-(2'-Hydroxyethyl)-amino-8-hydroxy-naphthalene-6-sulphonic acid | |

EXAMPLE 25

The water-moist dyestuff paste obtained according to Example 1 (before the dialysis) was stirred in 1000 ml of water and the mixture was brought to pH 1 with hydrochloric acid. The mixture was stirred until a homogeneous suspension was present. This was then filtered with suction and the resulting paste was stirred again in 1000 ml of water. The suspension was brought to pH 9.5 with concentrated ammonia, a solution being obtained. This was dialysed, to remove the chloride ions. It was then filtered through a 2.0μ filter and the solution was dried. The mixed ammonium/sodium salt of the dyestuff from Example 1 was obtained by this procedure.

It was possible to convert the dyestuffs of Examples 2 to 24 into their mixed ammonium/sodium salts in the same manner.

Further dyestuffs were obtained by using the following amines instead of ammonia: methylamine, dimethylamine, ethylamine, n-propylamine, isopropylamine, n-butylamine, piperidine, morpholine, N-methyl-ethanolamine, diethanolamine or triethanolamine.

EXAMPLE 26

3.0 g of dyestuff from Example 15 were dissolved in 100 g of a mixture of 84 g of water, 8 g of 1,5opentanediol and 8 g of 2-pyrrolidone. With an inkjet printer which operates in accordance with the principle of the bubble jet or the piezo technique, this ink gave sharply contoured black prints on paper which were fast to light, rubbing and water.

| Dyestuff from Example | Dyestuff (g) | Liquid medium (g) |
|---|---|---|
| 25 | 3 | 10 Diethylene glycol<br>90 Water |
| 25 | 3 | 60 Ethylene glycol<br>40 Water |
| 2 | 3 | 0.2 Sodium carbonate<br>20 2-Pyrrolidone<br>89.8 Water |
| 25 | 3 | 10 Ethylene glycol<br>5 N-Methylpyrrolidone<br>85 Water |
| 3 | 3 | 25 Glycerol<br>10 Triethanolamine<br>65 Water |

I claim:

1. A compound which, in the form of the free acid, corresponds to the formula (I)

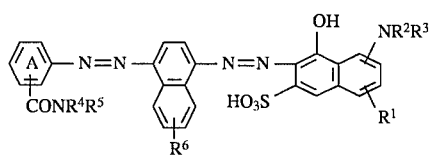

wherein the carboxamide group of the ring A is in the o-, m- or p-position relative to the azo bridge, $R^1$ denotes hydrogen or sulpho, $R^2$ and $R^3$ independently of one another represent hydrogen or an unsubstituted or substituted $C_6$–$C_{10}$-aryl radical, or represent unsubstituted or substituted $C_1$–$C_6$-alkyl, $R^4$ denotes, H, $CH_3$, a $C_1$–$C_{17}$-alkyl radical which is substituted by at least one substituent selected from the group consisting of OH, COOH, $OSO_3H$, $SO_3H$, CN and $OCH_3$, or denotes an aromatic $C_1$–$C_{10}$-aryl radical which is unsubstituted or substituted by at least one substituent selected from the group consisting of $C_1$–$C_4$-alkyl, $C_1$–$C_4$-alkoxy, halogen, $SO_3H$ and COOH, $R^5$ denotes a $C_1$–$C_{17}$-alkyl radical which is substituted by at least one substituent selected from the group consisting of OH, COOH, $OSO_3H$, $SO_3H$, CN and $OCH_3$, or denotes an aromatic $C_6$–$C_{10}$-aryl radical which is unsubstituted or substituted by at least one substituent selected from the group consisting of $C_1$–$C_4$-alkyl, $C_1$–$C_4$-alkoxy, halogen, $SO_3H$ and COOH, $R^6$ denotes H, $SO_3H$ or COOH, and the benzene ring A is optionally further substituted.

2. A compound according to claim 1, wherein the benzene ring A is optionally further substituted by halogen, $C_1$–$C_4$-alkyl and/or $C_1$–$C_4$-alkoxy.

3. A compound according to claim 1 of the formula (I) which correspond to the formula (II)

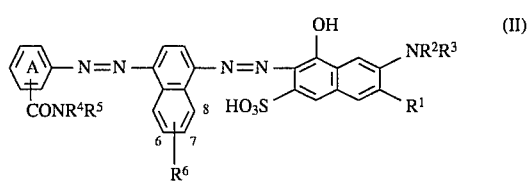

wherein $R^1$ to $R^6$ and A have the meaning given in claim 1 and $R^6$ is bonded in the 6-, 7- or 8-position of the naphthalene ring.

4. A compound according to claim 1 of the formula (I), wherein $R^2$ represents H or a radical of the formula

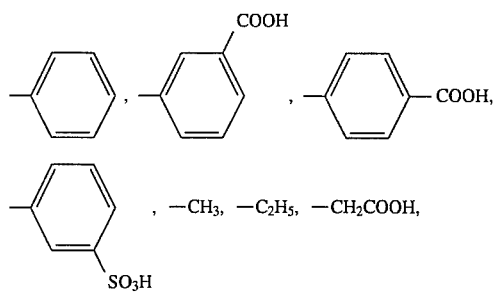

$-CH_2CH_2COOH$ or $-CH_2CH_2OH$, $R^3$ represents H or a radical of the formula $-CH_3$, $-C_2H_5$, $-CH_2COOH$, $-CH_2CH_2COOH$, $-CH_2CH_2OH$ or $-CH_2CH_2CN$ and the other radicals have the meaning given in claim 1.

5. A compound according to claim 1 of the formula (I), wherein $R^4$ denotes H or a radical of the formula $-CH_3$, $-CH_2CH_2OH$, $-CH_2COOH$, $-CH_2CH_2COOH$, $-CH_2CH_2SO_3H$ or $-CH_2CH_2OSO_3H$, $R^5$ denotes H or $-CH_3$, $-CH_2CH_2OH$, $-CH_2COOH$, $-CH_2CH_2COOH$, $-(CH_2)_3-COOH$, $-(CH_2)_4-COOH$, $-(CH_2)_5-COOH$, $-(CH_2)_9-COOH$, $-(CH_2)_{10}-COOH$, $-(CH_2)_{11}-COOH$, $-(CH_2)_{12}-COOH$,

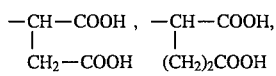

or

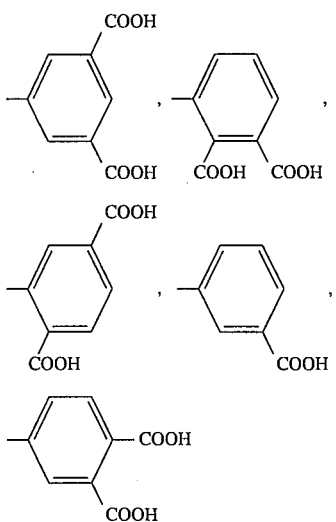

and the other radicals and the ring A have the meaning given in claim 1.

6. A compound according to claim 1 of the formula (I), wherein the number of COOH groups in the radicals $R^1$ to $R^5$ is one, two or three.

7. A compound according to claim 1 of the formula (I) which correspond to the formula (III)

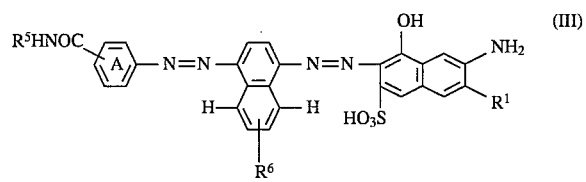

wherein $R^5$ denotes a radical of the formula

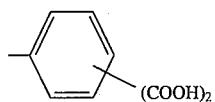

and $R^1$, $R^6$ and A have the meaning given in claim 1.

8. A compound according to claim 1, wherein $R^1$=H and $R^6$=SO$_3$H, or $R^1$=SO$_3$H and $R^6$=SO$_3$H, or $R^1$=SO$_3$H and $R^6$=H, or $R^1$ and $R^6$=H.

9. The compound according to claim 1, wherein $R^2$ and $R^3$ independently of one another represent hydrogen or an unsubstituted or substituted phenyl radical or an unsubstituted or substituted phenyl radical, or an unsubstituted or substituted $C_1$–$C_6$-alkyl.

10. The compound according to claim 7 of the formula (III) wherein $R^5$ denotes a radical of the formula

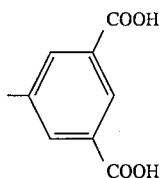

11. A process for the preparation of the compounds of the formula (I) according to claim 1, wherein amines of the formula (IV)

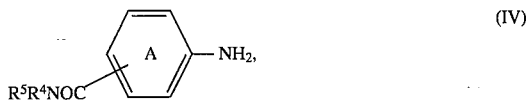

wherein the carboxamido group is in the o-, m- or p-position relative to the NH$_2$ group, $R^4$ and $R^5$ have the meaning given in claim 1 and the ring A can be further substituted in the manner given in claim 1, are diazotized and the diazotization products are coupled with 1-aminonaphthalenes of the formula (V)

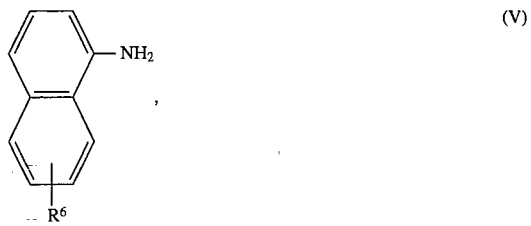

wherein $R^6$ has the meaning given in claim 1, in the acid to neutral pH range to give a monoazo dyestuff of the formula (VI)

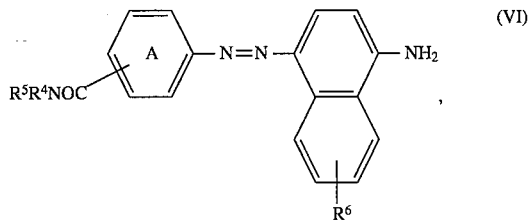

which is then diazotized, and the diazotization product is coupled with a coupling component of the formula (VII)

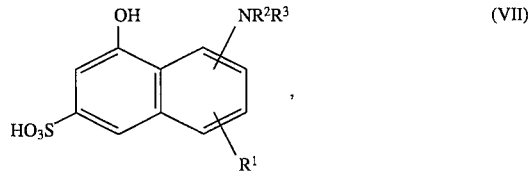

wherein $R^1$, $R^2$ and $R^3$ have the meaning given in claim 1, in the neutral to alkaline pH range to give the dyestuff of the formula (I).

12. The process according to claim 11, wherein the monoazo dyestuff of the formula (VI) is diazotized without intermediate isolation.

13. An ink which is suitable as an inkjet recording liquid comprising about 1 to 20% by weight of a dyestuff according to claim 1 of the formula (I), 80 to 99% by weight of water and/or polar protic or dipolar aprotic solvents.

14. In the inkjet printing of a recording system wherein an ink is applied to a recording substrate by inkjet printing, the improvement wherein such ink is an ink according to claim 13.

15. A process for dyeing or printing organic substrates containing hydroxyl groups or amide groups by applying thereto a compound according to claim 1.

16. A process according to claim 15 wherein the organic substrate is a textile material consisting of or comprising cellulose fibers or is paper or leather.

* * * * *

UNITED STATES PATENT AND TRADEMARK OFFICE
CERTIFICATE OF CORRECTION

PATENT NO. : 5,580,965
DATED : December 3, 1996
INVENTOR(S) : Jager, Horst

It is certified that error appears in the above-indentified patent and that said Letters Patent is hereby corrected as shown below:

Col. 12, line 1  Delete " $C_1$-$C_{10}$-aryl " and substitute -- $C_6$-$C_{10}$-aryl --

Signed and Sealed this

Twenty-second Day of April, 1997

BRUCE LEHMAN

*Commissioner of Patents and Trademarks*

*Attest:*

*Attesting Officer*